July 7, 1970  J. R. HARKNESS  3,518,979
SAFETY DEVICE FOR MACHINE POWERED BY SMALL GAS ENGINE
Filed Aug. 23, 1968  2 Sheets-Sheet 1
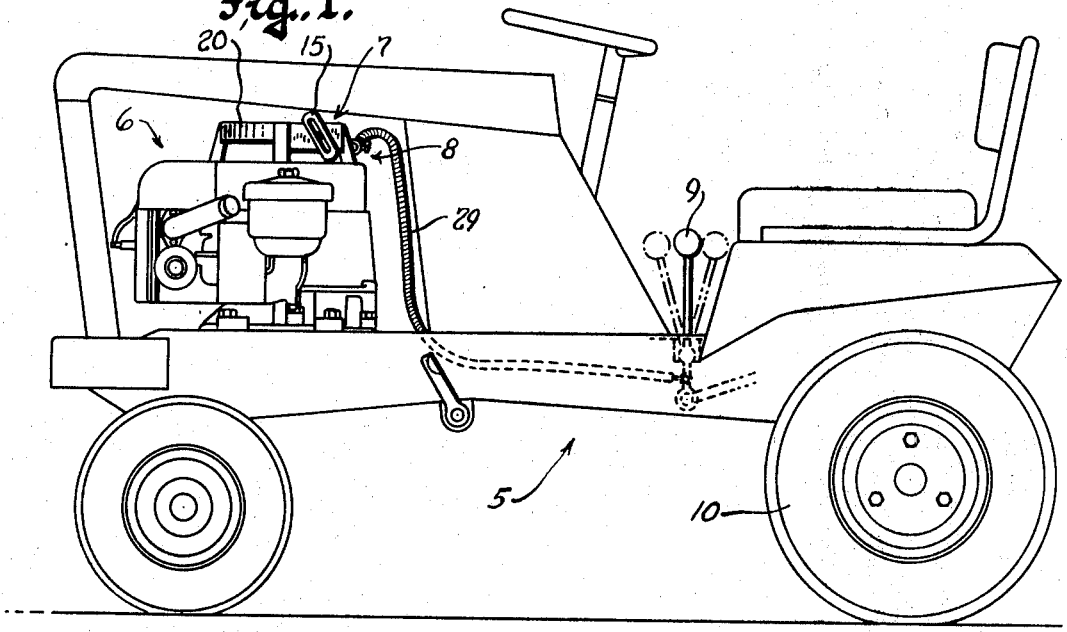
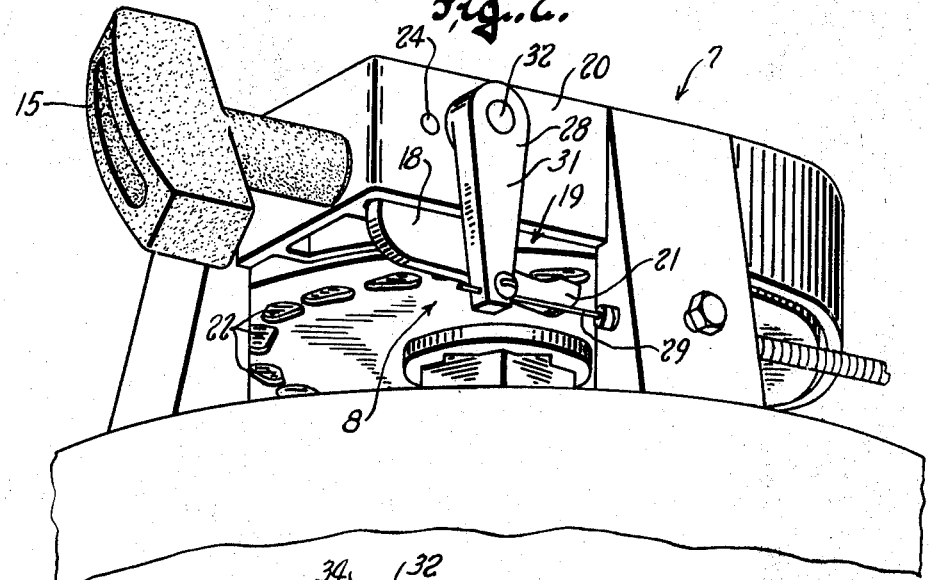
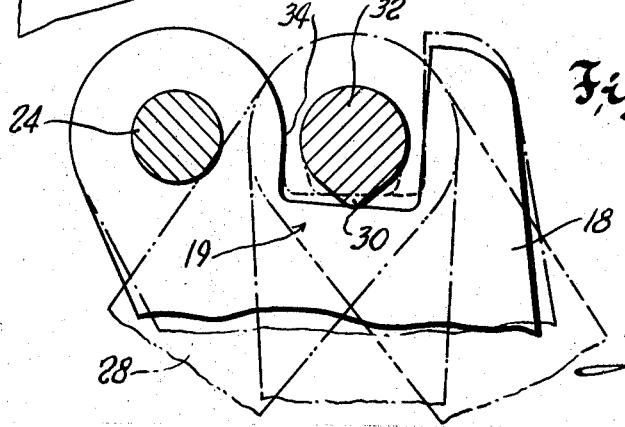
Inventor
Joseph R. Harkness

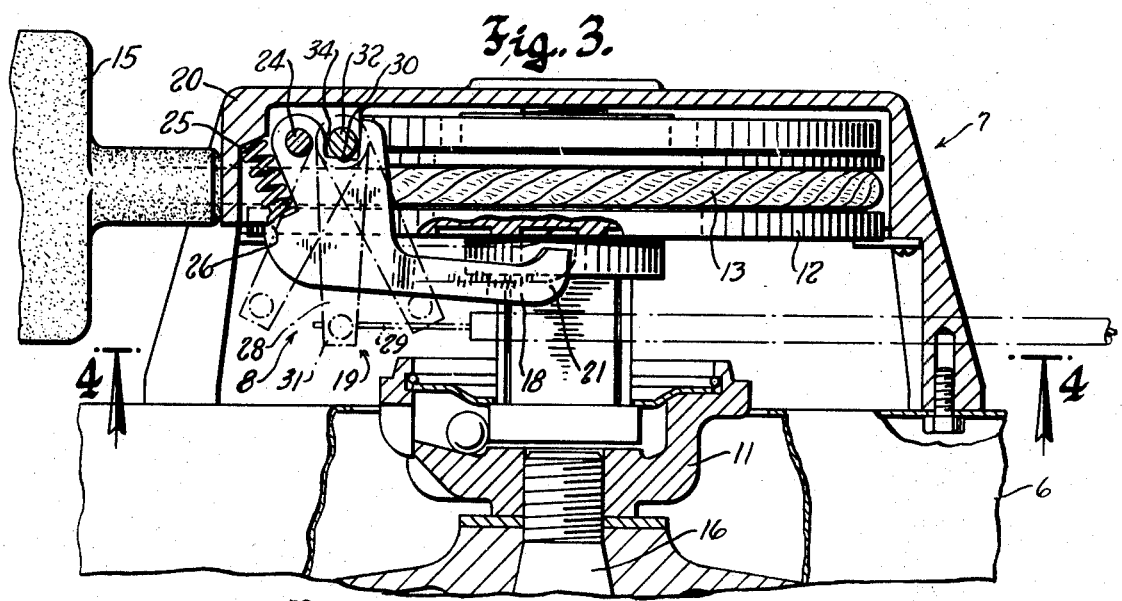
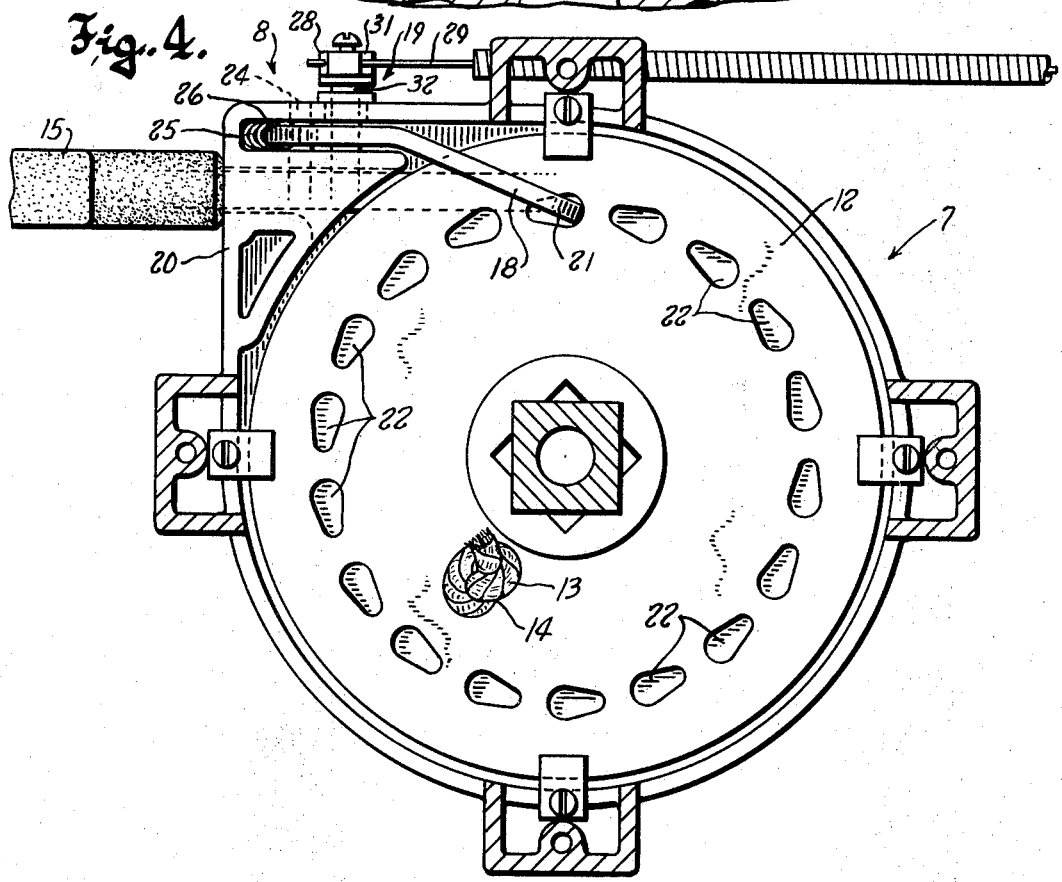

United States Patent Office 3,518,979
Patented July 7, 1970

3,518,979
SAFETY DEVICE FOR MACHINE POWERED BY SMALL GAS ENGINE
Joseph R. Harkness, Germantown, Wis., assignor to Briggs & Stratton Corporation, Milwaukee, Wis., a corporation of Delaware
Filed Aug. 23, 1968, Ser. No. 754,872
Int. Cl. F02n *17/00*
U.S. Cl. 123—179                  3 Claims

ABSTRACT OF THE DISCLOSURE

In a machine powered by a small engine with a manually energized starter, and having a manually shiftable control for engine-machine coupling and uncoupling, the manually rotatable element of the starter has ratchet-like stop abutments engageable by a movable latching member. The latching member is so connected with the control as to be held clear of the abutments when the control is in its engine uncoupling position, but otherwise engages them.

---

This invention relates generally to small internal combustion engines of the type having manually energized starting mechanisms, and pertains more specifically to means for preventing the starting of such an engine when a manually actuatable control on a machine powered by the engine is in such a condition that starting the engine might be dangerous.

Small engines of the type with which this invention is concerned are used for powering a large variety of self-propelled implements such as lawn mowers, garden tractors, snow blowers, tillers and the like. Usually such a machine has a manually operable control by which the engine can be coupled to and uncoupled from the propulsion drive mechanism, and when the engine is being started that control is intended to be set in its position to uncouple the engine lest the machine begin to move without guidance. But because that control is manually operated, it can be in the wrong position when the engine is started, with potentially dangerous consequences.

For example, a riding garden tractor, which may weigh several hundred pounds, usually has a gear shift lever that should be in its neutral position during engine starting and which is located in front of the driver's seat and some distance behind the engine. When such a tractor is powered by an engine having a rewind rope starter, the operator's position for engine starting is at one side of the tractor, near the front of it, where the gear shift lever is not readily accessible to him. If he starts the engine with the gear shift lever in one of its driving positions, the tractor will immediately begin to move, and he may not be able to regain control of it until it has done a great amount of damage, possibly including the infliction of personal injuries upon the operator or others.

With the foregoing considerations in mind, it is a general object of this invention to provide safety apparatus for preventing the starting of an internal combustion engine having a manually energized starting mechanism when a manually operable control on a machine powered by the engine is in such a position that engine starting might be dangerous.

Any such safety device must meet certain criteria which are virtual imperatives.

Perhaps the most important of these is that the device have an all but infallible dependability. It must be immune not only to mechanical failure but also to interference from the operator, for a safety device that fails or that can be rendered ineffective is more dangerous than none at all, inasmuch as the operator tends to rely on the safety device to compensate for his own lack of attention to safe operating procedures.

Mechanical dependability requires that such a safety device be capable of withstanding extremes of heat, cold, dust, moisture and vibration; that it operate satisfactorily with a minimum of lubrication and maintenance (preferably none); and, generally, that it survive a long life of abuse. Nevertheless, such a device cannot fulfill its purpose unless the customer is willing to buy it, and therefore it must be very low in cost, must not detract from the appearance of the engine or the machine powered by it, and must not inconvenience the operator in the normal and proper use of the equipment.

In addition to meeting these essential requirements, it is also desirable that a safety device of the character described should give an unambiguous signal to the operator of the need for shifting the manually operated control member by which it is governed. Thus a device which disables the engine ignition system when conditions are unsafe for engine starting might meet the above enumerated essential requirements, but it would not give the operator an unmistakeable indication of the reason why the engine failed to start, so that he might be as likely to investigate for a possible malfunctioning of the engine as to check the position of the manually actuated control that governed the safety device.

In view of the foregoing observations, it is another object of this invention to provide a safety device of the character described that combines the utmost dependability with extremely low cost, and which provides the operator with an unmistakeable signal or indication when it is effective and, by reason of its simplicity, gives the operator no occasion to render it ineffective except by adherence to the safe operating procedure that it is intended to compel.

It is also an object of this invention to provide a safety device of the character described which does not detract from the appearance of an engine on which it is installed or of a machine powered thereby, and which does not affect normal performance of the engine in any manner.

It is a further object of this invention to provide a safety device of the character described which is readily adaptable to a great variety of engine powered machines and implements, and which is inexpensive in itself and is capable of being very easily and quickly installed on any machine on which its presence would be desirable, without requiring any material modification of the machine.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIG. 1 is a view in side elevation of a small riding tractor powered by an internal combustion engine which has a rewind rope starting mechanism and is equipped with the safety device of this invention;

FIG. 2 is a bottom perspective view of the rope starter mechanism and the safety device of this invention;

FIG. 3 is a view partly in vertical section and partly in side elevation of the structure shown in FIG. 2;

FIG. 4 is a sectional view of the starter mechanism and the safety device of this invention, taken generally on the plane of the line 4—4 in FIG. 3 and looking upward from beneath the starter mechanism; and FIG. 5 is a fragmentary diagrammatic view on an enlarged scale illustrating the cooperation between the latch member and its actuator in the safety device of this invention.

Referring now to the accompanying drawings, the numeral 5 designates generally a self propelled machine, illustrated as a small riding tractor, powered by a single cylinder gasoline engine 6 having a manually energized starter mechanism 7 and equipped with a safety device 8 that embodies the principles of this invention.

Any such self-propelled machine incorporates some type of manually shiftable control by means of which the engine can be coupled to and uncoupled from the traction means of the machine, and in this case such manual control is illustrated as comprising a gear shift lever 9 that has a neutral position in which the rear traction wheels 10 of the tractor are not drivingly coupled to the engine. The gear shift lever can be moved both forwardly and rearwardly from its neutral position, to various gear change positions in which the engine can drive the wheels.

The engine 6 is illustrated as being of the vertical crankshaft type, and the starter mechanism 7, which is located at the top of the engine, is illustrated as the familiar rewind rope starter.

In any manually energized starter mechanism there is a manually rotatable element to which an operator applies torque, as by means of a crank handle in the case of a spring windup starter or by means of a coiled rope in the illustrated mechanism, and such torque is applied to the engine crankshaft through means comprising an overrunning clutch 11 which permits the crankshaft to rotate independently of the rotatable element when the engine runs under its own power. Hence the rotatable element can be held against turning when the engine is running, without interfering with normal engie operation. Accordingly, the safety device of this invention locks the rotatable element against rotation whenever the gear shift lever 9 is out of its neutral position.

In the case of the recoil or rewind rope starter here illustrated, the manually rotatable element comprises a sheave 12 to which a rope 13 is eccentrically attached as at 14 (see FIG. 4). The rope is normally coiled around the periphery of the sheave 12, but when pulled by means of a T-handle 15 at its free end it uncoils from the sheave, turning the sheave in the direction that the engine crankshaft 16 is to be rotated for starting.

The torque thus applied to the sheave is imparted to the engine crankshaft through an overrunning clutch 11. When the engine runs, the overrunning clutch allows the crankshaft to rotate independently of the sheave, and it also permits the sheave to rewind the starting rope automatically under the influence of a torsion spring (not shown) which is connected with the sheave and biases it in the direction opposite to that in which it is rotated for starting.

According to the present invention, whenever the manually shiftable control 9 is in such a position that starting of the engine would be dangerous, the manually rotatable element 12 of the starter mechanism is engaged by a latching member 18 which locks the rotatable element against rotation, thereby preventing starting of the engine and indicating to the operator that the manually shiftable control needs attention. But if the manually shiftable control is in a position at which the engine can be safely started, a connection 19 between it and the latching member 18 causes the latching member to be held out of engagement with the rotatable element to permit normal engine starting.

In the illustrated embodiment, the latching member 18 comprises a pawl which is swingably mounted on the starter mechanism housing 20 and which has a free end portion 21 that is swung to and from an operative position in which it is within the orbit of a plurality of circumferentially spaced stop abutments 22 on the rope sheave 12, which abutments face in the direction of starting rotation and function as ratchet teeth. As shown, the abutments 22 are defined by holes in the web portion of the rope sheave, into which the free end portion 21 of the pawl is readily receivable.

The pawl is preferably made from a flat piece of metal with a generally boot shaped outline, and it is pivoted on a pin 24 which extends through its top portion and which is secured in the starter mechanism housing 20. The foot portion of the pawl extends beneath the rope sheave, being bent obliquely out of the plane of the remainder thereof as best seen in FIG. 4, and its free end portion 21 is in the form of an upwardly projecting toe that can engage in the rachet holes 22. A compression spring 25, reacting between the starter housing and a spur-like upward projection 26 on the heel portion of the pawl, biases the pawl toward its operative position, that is, in the direction to swing its toe portion 21 upwardly.

The connection 19 between the pawl and the gear shift lever 9 comprises an actuator 28 which is confined to back and forth motion, and a cam 30 on the actuator which bears against the pawl. The actuator comprises a lever 31, a pin 32 to which the lever 31 is fixed and by which it is swingably carried, and a bowden wire 29 by which the actuator lever 31 is connected with the gear shift lever. The pin 32 that carries the actuator lever is mounted in the starter mechanism housing 20, near the pin 24 on which the pawl is trunnioned, and with its axis substantially parallel to that of said pin 24. The cam 30 is formed on the pin 32 and is accommodated in a notch 34 in the top of the pawl.

The actuator 31 extends generally downwardly from the pin 32, and the front end of the bowden wire 29 is connected to its lower end. The rear end of the bowden wire is connected to the gear shift lever 9, and the bowden wire is so adjusted that when the shift lever is in its neutral position, the actuator lever 31 is substantially straight up and down, in which position of the lever 31 the lobe of the cam 30 is engaged with the bottom of the notch 34 in the pawl and holds the pawl out of its operative position.

Since the shift lever must be moved either forward or rearward from neutral to get it into one of its driving positions, the actuator lever will be inclined either forwardly or rearwardly when the shift lever is out of neutral, and consequently the cam will be in a rotational position in which it lets the pawl occupy its operative position, with its free end in the orbit of the stop abutments 22 provided by the holes in the rope sheave.

From the foregoing description taken with the accompanying drawings it will be apparent that this invention provides a compact, highly dependable, easily installed and very inexpensive safety device for a gasoline engine having a manually energized starter, which safety device prevents starting of the engine when a machine powered by the engine is drivingly coupled therewith; and it will be further apparent that the safety device of this invention, despite its low cost, is capable of functioning under every sort of unfavorable condition without requiring maintenance or attention, and that it cannot be readily disabled by an operator except by normal and proper operation of the equipment.

What is claimed as my invention is:

1. In a gasoline engine having a starter mechanism that comprises an element that is manually rotatable in one direction and means comprising an overrunnig clutch by which torque applied to said element can be imparted to the crankshaft of the engine but by which the crankshaft is enabled to rotate independently of said element:
   (A) means on the manually rotatable element providing a plurality of circumferentially spaced stop abutments which face in the direction of its rotation;
   (B) a pawl movable toward and from an operative position in which a part of the pawl is engageable with any one of said stop abutments to prevent rotation of the manually rotatable element, said pawl being biased toward said operative position;

(C) an actuator mounted on the engine for motion to and from a defined position and connectable with a manually movable control member on a machine powered by the engine for actuation thereby; and (D) cooperating cam means on said actuator and on the pawl providing a one-way motion transmitting connection between them and arranged to effect motion of the pawl away from its operative position in consequence of motion of the actuator to its said defined position.

2. In a machine of the type powered by a gasoline engine and having a manually actuatable control member shiftable to and from a defined position in which a driving connection between the engine and the machine is disengaged, and wherein the engine has a starter mechanism that comprises a manually rotatable element and means comprising an overrunning clutch by which torque applied to said element can be imparted to the engine crankshaft but by which the crankshaft is enabled to rotate independently of said element:

(A) means on the manually rotatable element providing a plurality of circumferentially spaced stop abutments;

(B) a latch member confined to motion to and from an operative position in which a part thereof is engageable with the stop abutments to prevent rotation of said element, said latch member being biased toward said position; and (C) means providing a motion transmitting connection between the control member and the latch member, the last mentioned means comprising a pair of parts that are engageable to transmit motion only in one direction and which are arranged to effect motion of the latch member against its bias in consequence of motion of the control member to its said defined position, (1) one of said parts being on one of said members and (2) the other of said parts being on an actuator which is confined to motion in opposite directions and which has a motion transmitting connection with the other of said members.

3. In a machine of the type powered by a gasoline engine and having a manually actuatable transmission control member that is shiftable in opposite directions from a defined neutral position in which a driving connection between the engine and the machine is disengaged, and wherein the engine has a starter mechanism that comprises a manually rotatable element and means comprising an overrunning clutch by which torque applied to said element can be imparted to the engine crankshaft but by which the crankshaft is enabled to rotate independently of said element:

(A) means on the manually rotatable element providing a plurality of circumferentially spaced stop abutments;

(B) a latch member confined to motion to and from an operative position in which a part thereof is engageable with the stop abutments to prevent rotation of said element, said latch member being biased toward said position; and (C) cam means providing a one-way motion transmitting connection between the control member and the latch member for translating motion of the control member in each direction toward its neutral position into motion of the latch member out of its operative position, and permitting the latch member to move under bias to its operative position whenever the control member is moved out of its neutral position.

References Cited

UNITED STATES PATENTS

| | | |
|---|---|---|
| 1,272,101 | 7/1918 | Rice. |
| 1,732,851 | 10/1929 | Littler. |
| 2,998,809 | 9/1961 | Thomas. |

LAURENCE M. GOODRIDGE, Primary Examiner

U.S. Cl. X.R.

123—185